United States Patent
Schrepp et al.

(10) Patent No.: US 7,908,557 B2
(45) Date of Patent: Mar. 15, 2011

(54) PRESENTING MESSAGE DETECTABLE BY SCREEN READER APPLICATION

(75) Inventors: Martin Schrepp, Hockenheim (DE); Rakesh Jani, Walldorf (DE)

(73) Assignee: SAP AG, Walldorf (DE)

( * ) Notice: Subject to any disclaimer, the term of this patent is extended or adjusted under 35 U.S.C. 154(b) by 1253 days.

(21) Appl. No.: 11/215,502

(22) Filed: Aug. 30, 2005

(65) Prior Publication Data

US 2006/0288283 A1    Dec. 21, 2006

Related U.S. Application Data

(60) Provisional application No. 60/691,211, filed on Jun. 16, 2005.

(51) Int. Cl.
*G06F 3/00* (2006.01)
*G06F 3/048* (2006.01)
*G06F 3/16* (2006.01)

(52) U.S. Cl. ........ 715/729; 715/727; 715/781; 715/796; 715/808; 715/865; 715/978

(58) Field of Classification Search .................. 715/727, 715/729, 781, 796, 808, 865, 978
See application file for complete search history.

(56) References Cited

U.S. PATENT DOCUMENTS

| | | | |
|---|---|---|---|
| 6,697,781 B1 * | 2/2004 | Sahlberg | 704/260 |
| 7,313,757 B2 * | 12/2007 | Bradley et al. | 715/234 |
| 2002/0113810 A1 * | 8/2002 | Radtke et al. | 345/710 |
| 2002/0194219 A1 * | 12/2002 | Bradley et al. | 707/506 |
| 2004/0145607 A1 * | 7/2004 | Alderson | 345/746 |
| 2005/0028084 A1 * | 2/2005 | Dziejma | 715/505 |
| 2006/0253831 A1 * | 11/2006 | Harper et al. | 717/106 |
| 2007/0198945 A1 * | 8/2007 | Sun et al. | 715/779 |

OTHER PUBLICATIONS

Bohlman, E. "Tinytalk: a powerful, low-cost screen reader". Feb. 1-5, 1992. Proceedings of the Johns Hopkins National Search for Computing Applications to Assist Persons with Disabilities. pp. 191-192.*

Neward, Ted. "Effective Enterprise Java", Aug. 26, 2004. Addison-Wesley Professional. Chapter 6: Presentation, Item 56: "Validate early, validate everything".*

'Microsoft Needs Review of Accessibility Document (Ignore if You've Seen)' [online]. Nfbcal, May 9, 1995, [retrieved on Apr. 20, 2005]. Retrieved from the Internet: <URL: http://www.nfbcal.org/nfb-rd/0627.html>.

(Continued)

*Primary Examiner* — Dennis-Doon Chow
*Assistant Examiner* — Grant D Johnson
(74) *Attorney, Agent, or Firm* — Fish & Richardson P.C.

(57) ABSTRACT

A method of visually presenting a message includes detecting that a screen reader application is being used in a computer system having a graphical user interface (GUI). The GUI presents messages of a first type by displaying a popup window and presents messages of a second type in a predefined field of the GUI. The screen reader application is configured to detect display of the popup window but not configured to detect presentation of the messages of the second type in the predefined field. The method includes detecting a system event that causes a first message to be presented in the predefined field, the system event resulting from evaluating user input information. The method includes presenting, in response to detecting the system event, a second message in the popup window, the second message being associated with the first message. The predefined field may relate to a message log.

33 Claims, 5 Drawing Sheets

OTHER PUBLICATIONS

'The Problems and Challenges of the Graphical User Interface' [online]. National Federation of the Blind, Nov. 4, 1993, [retrieved on Apr. 19, 2005]. Retrieved from the Internet: <URL: www.rit.edu/~easi/easisem/thatcher.html>.

'Developer Guidelines' [online]. IBM Accessibility Center, unable to verify publication date, [retrieved on Apr. 20, 2005]. Retrieved from the Internet: <URL: http://web.archive.org/web/20040327011826/http:www-306.ibm.com/able/guidelines/java/snsjavagessential_.html>.

'Filling Out Forms:' [online]. Pacbell, unable to verify publication date, [retrieved on Apr. 19, 2005]. Retrieved from the Internet: <URL: http://home.pacbell.net/thammon/blind/forms.html>.

'Accessible Flex Components' [online]. Macromedia, unable to verify publication date, [retrieved on Apr. 19, 2005]. Retrieved from the Internet: <URL: http://www.macromedia.com/macromedia/accessibility/features/flex/components.html>.

'How Does a Screen Reader Work?' [online]. Iowa Department for the Blind, unable to verify publication date, [retrieved on Apr. 19, 2005]. Retrieved from the Internet: <URL: http://www.blind.state.ia.us/access/how.htm>.

'GW Micro Product Information' [online]. GW Micro, unable to verify publication date, [retrieved on Apr. 19, 2005]. Retrieved from the Internet: <URL: http://www.gwmicro.com/catalog/index.php?doProdItem=Window-Eyes+Professional&group=we&fromDealer=GW%2520Micro>.

'Finding the right product for you' [online]. Screen reader, unable to verify publication date, [retrieved on Apr. 19, 2005]. Retrieved from the Internet: <URL: http://www.screenreader.co.uk/products/finding/htm>.

'Hal Screen Reader' [online]. Barry Bennett Ltd, unable to verify publication date, [retrieved on Apr. 20, 2005]. Retrieved from the Internet: <URL: http://www.barrybennett.co.uk/software/screenreading/hal.htm>.

* cited by examiner

| Accounts | | | | | | | | |
|---|---|---|---|---|---|---|---|---|
| Show My Favorites ▶ | Get | Account ID ▶ | | Go | | Open Advanced Search | | Settings |
| Create... | Save | Remove From Favorites | Fact Sheet | Change | | | ◀ ▶ Page 1 of 1 | Filter On |
| Name ◆▶ | Partner Category ◆▶ | House ◆▶ | Street ◆▶ | City ◆▶ | Postal Code ◆▶ | Country ◆▶ | Contact ID ◆▶ | Telephone ◆▶ | Grouping ◆▶ |
| ComputerServ | Organization | 24 | Hardtstraße | Märklingen | 68766 | XX 102 | | | Internal |
| NetworkLogics | Organization | 24 | Hardtstraße | Märklingen | 68766 | DE 104 | 105598 | +49(6278)73-0 | Internal |

PRESENTING MESSAGE DETECTABLE BY SCREEN READER APPLICATION

CROSS-REFERENCE TO RELATED APPLICATION

This application claims priority from U.S. Provisional Application No. 60/691,211, filed Jun. 16, 2005 and entitled "Accessibility Mode For Message Log," the entire contents of which are incorporated herein by reference.

TECHNICAL FIELD

The description relates to presenting, upon a first message being presented in a predefined field, a second message in a popup window.

BACKGROUND

Computer manufacturers and administrators strive to offer disabled persons access to their computer systems and thereby to the software applications that can be executed therein. Several countries including the United States have introduced legislation prescribing adequate levels of accessibility. The applicable regulations affect the configuration and operation of the user interface, in particular the graphical user interface (GUI).

Users who are blind or otherwise visually impaired are a special group of disabled users for whom the conventional GUI is not adequate. For this group, there has been developed several software products that allow users to interpret and recognize the contents that are presented on a traditional computer screen. Such applications convert the textual GUI contents to an output format that is tailored to the visually impaired user, for example through a connected output device for Braille code or synthesized speech. There are differences between the programs created by different manufacturers, but the applications are collectively referred to as screen reader applications.

Many business software systems interact with their users by sending messages, for example in a popup window that appears "on top of" the window that is currently active in the GUI. Screen readers often have a "screen reader focus" that is automatically or manually moved to different locations on the screen to determine what content(s) the screen reader should interpret. Screen readers may be configured to "notice" that a popup window has appeared and automatically place the screen reader focus on the popup window. This alerts the user that the popup has appeared and lets the user interpret its contents.

Some computer systems also use other techniques for presenting messages. For example, enterprise resource planning (ERP) software typically handles many messages to its users because there is a high volume of complex data being entered or modified in the system. In such systems there has been introduced a message log that collects certain types of messages for a user during a session. It may be that the user is entering data in input fields of an application and the application is configured to determine whether the entered data is inconsistent or otherwise not valid. Each instance of faulty data may result in an error message being generated and placed in the message log. A user who is not visually impaired typically notices the change when the predefined field is updated to display the new message. The user can review the generated message(s) immediately or at a later time. In some systems from SAP AG in Walldorf (Baden), Germany, the GUI contains a field for presenting the most recent message in the message log. The user can click on the field to access the message(s) in the message log. Each message may include contents that are specific for the particular error, such as a short explanation and a link to the screen and/or input field where the error occurred.

Screen readers may, however, not be capable of detecting that the GUI field for the message log is being updated. This makes it difficult for manufacturers to ensure user accessibility in systems that display messages in message logs, status fields or other dedicated screen areas. Also, it may be difficult for developers of screen readers to anticipate and provide sufficient detection capability for different types of field-based messages.

SUMMARY

The invention relates to presenting a message that can be detected by a screen reader application.

In a first general aspect, the invention comprises a method of visually presenting a message in a computer system. The method comprises detecting that a screen reader application is being used in a computer system having a graphical user interface (GUI). The GUI presents messages of a first type by displaying a popup window and presents messages of a second type in a predefined field of the GUI. The screen reader application is configured to detect display of the popup window but is not configured to detect presentation of the messages of the second type in the predefined field. The method comprises detecting a system event that causes a first message to be presented in the predefined field. The system event results from evaluating user input information. The method comprises presenting, in response to detecting the system event, a second message in the popup window, the second message being associated with the first message.

Selected embodiments may include one or more of the following features. A user of the computer system may be associated with a user profile that indicates that the screen reader application is to be used, and the user profile is used in detecting that the screen reader application is being used. The user input information may be evaluated for validity and the first message may correspond to an error being detected in the user input information. The screen reader focus may be located in a first portion of the GUI when the system event is detected and the second message may announce to a user that the first message is presented in the predefined field. The second message may provide a user-selectable option to move the screen reader focus to the predefined field. The user may select the user-selectable option and the screen reader focus may later be automatically returned to the first portion of the GUI. The second message may provide a user-selectable option to not move the screen reader focus to the predefined field. The second message may include the first message. The computer system may include a message log for holding the messages of the second type, and the computer system may be configured to present a most recent message of the message log in the predefined field.

In a second general aspect, the invention comprises a computer program product tangibly embodied in an information carrier, the computer program product comprising instructions that, when executed, generate on a display device a graphical user interface (GUI) for presenting a message detectable by a screen reader application. The GUI comprises a popup window that is displayed for presenting messages of a first type, wherein the screen reader application is configured to detect display of the popup window. The GUI comprises a predefined field for presenting messages of a second type that result from evaluating user input information, wherein the screen reader application is not configured to detect presentation of a message in the predefined field. Upon detection of a system event that causes a first message to be presented in the predefined field, a second message associated with the first message is presented in the popup window.

Selected embodiments may include one or more of the following features. A screen reader focus may be located in a first portion of the GUI when the system event is detected and the second message may announce to a user that the first message is presented in the predefined field. The second message may provide a user-selectable option to move the screen reader focus to the predefined field. The user may select the user-selectable option and the screen reader focus may later automatically be returned to the first portion of the GUI. The second message may provide a user-selectable option to not move the screen reader focus to the predefined field. The second message may include the first message.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1 shows a GUI that displays messages to a user, and with which visually impaired users can use a screen reader application;

Like reference numerals in the various drawings indicate like elements.

DETAILED DESCRIPTION

FIG. 1 shows a GUI 100 being used with a computer system that is configured to generate messages for display in a predefined field. The messages may be presented in response to a system event that results from evaluating user input. If the system detects that a screen reader application is being used, the system also displays a second message, associated with the first message, in a popup window. If the screen reader application detects that the popup window is being displayed, it generates an output intended for a visually impaired user.

For example, the GUI 100 may be used to manage accounts in a business management system. Thus, the GUI can display the contents of one or more account objects for review and possibly revision by a user. Particularly, the GUI may let the user make an entry in a Country field 102 for a selected account object. Here, the contents of the Country field are part of an address for the entity associated with the account. To enter or modify this information while using a screen reader application the user may place a screen reader focus 104 at the field 102 as schematically illustrated by a dashed outline.

Here, assume for purposes of exemplification that the user enters the characters "XX" in the field 102. Unlike strings such as "US" and "DE," the string "XX" is not an existing country code. The system analyzes the "XX" data entry and determines that it is not a valid entry for the Country field 102. Because the entry is invalid, the system generates an error event. The error event will cause an error message to be presented in a predefined field of the GUI.

Figure 2:
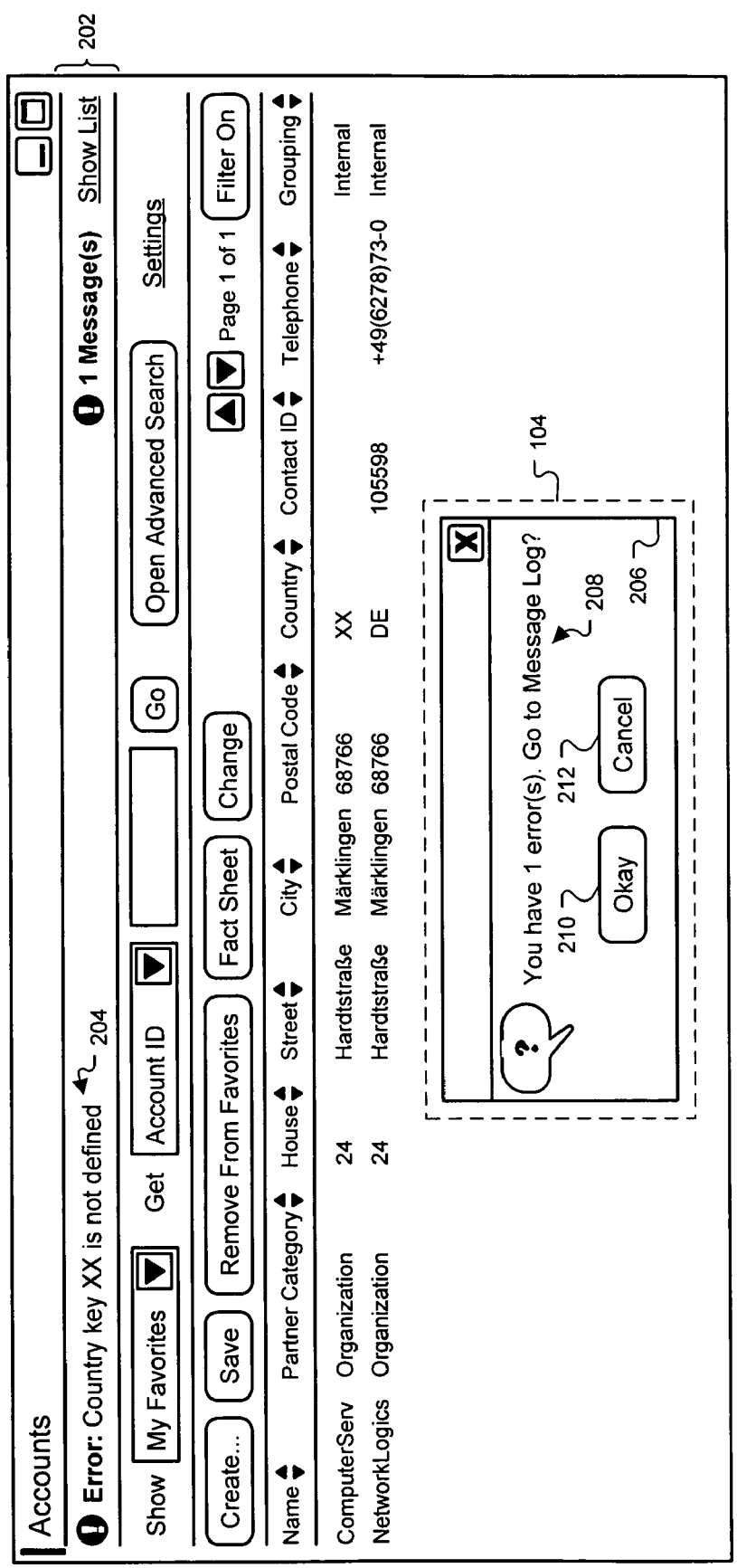
FIG. 2 shows messages being presented in a predefined field and in a popup window in the GUI of FIG. 1.

FIG. 2 shows that the GUI 100 includes a predefined field 202 that is used for presenting a certain type or types of messages. For example, the predefined field 202 is used for presenting error messages resulting from the user entering invalid data in any field of the GUI. If the computer system also includes a message log for collecting various error messages, the predefined field 202 may be configured to always present the most recent message from the message log. The predefined field 202 currently presents a first message 204 that reads: "Error: Country key XX is not defined," resulting from analyzing the above-mentioned user input and determining that it is invalid.

The system also generates a popup window 206 that displays a second message 208 stating: "You have 1 error(s). Go to Message Log?" The screen reader may be configured to detect the generation of the popup window 206 but not to detect the presentation of a message in the predefined field 202. Upon the screen reader application detecting that the popup window is being generated, it may automatically move the screen reader focus 104 from its position at the field 102 (see FIG. 1), to the popup window 206. This allows the user, through the functionality of the screen reader application, to interpret the contents of the second message 208.

The second message 208 is associated with the first message 204. Here, the second message 208 announces that an error message has been generated but does not convey the nature of the error or any further details. In other implementations, the second message 208 may include some or all of the contents of the first message 204, for example by incorporating the first message 204 in its entirety.

The popup window 206 may include one or more user-selectable options, such as an Okay button 210 that moves the screen reader focus 104 from the popup window 206 to the predefined field 202. This allows the user of the screen reader application to interpret the contents of the first message 204. Here, the popup window 206 also contains a Cancel button 212 that causes the screen reader focus 104 to return to the Country field 102. Thus, the Cancel button 212 lets the user continue working on the current task without reviewing every error message as it appears. If error messages are collected in a message log, the user can visit the message log later to review the generated error messages.

If the user chooses the Cancel button 212, the screen reader focus 104 automatically returns to its previous position in the GUI 100. This prevents the user from losing his or her place in the GUI. Thus, after the user reads the second message 208 in the popup window 206 and clicks the Cancel button 212, the screen reader focus 104 is moved back to the Country field 102 of FIG. 1. In contrast, if the user clicks the Okay button 210, the focus 104 is moved from the popup window 206 to the predefined field 202. This may allow the user to access the most recent error message in a message log.

Figure 3:
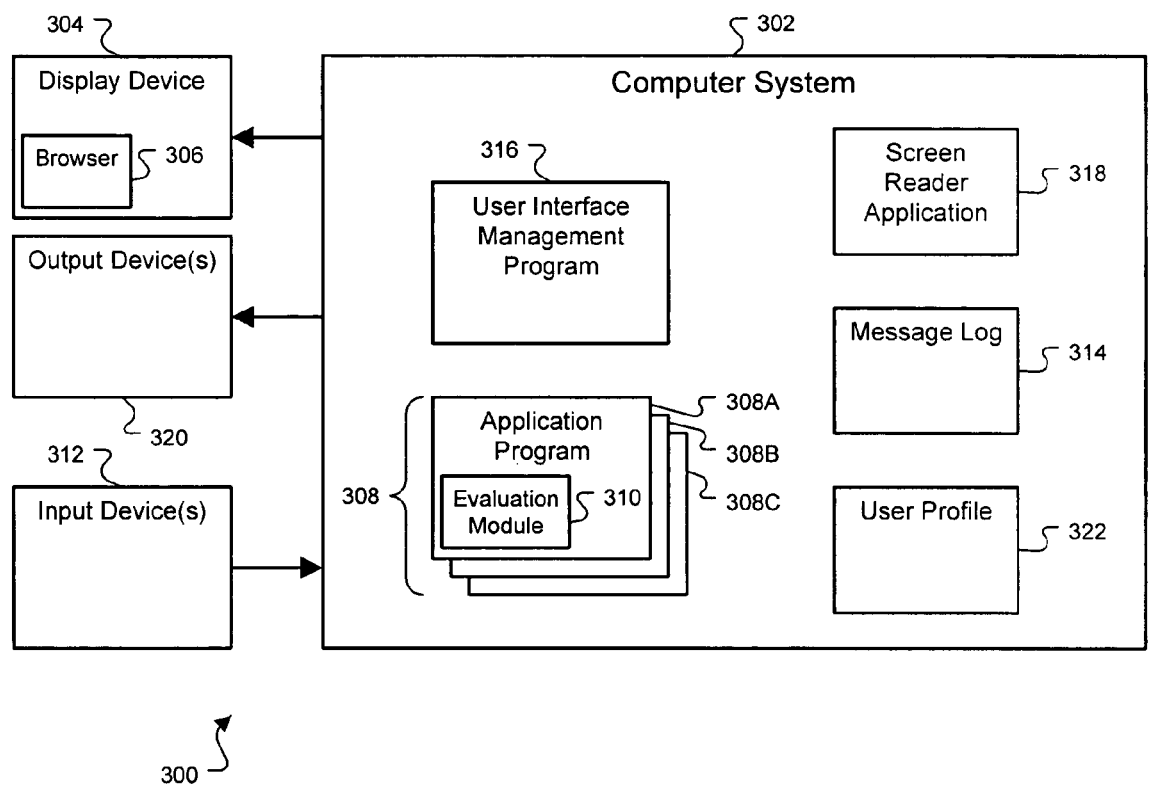
FIG. 3 is a block diagram of a system that can generate the GUI shown in FIGS. 1 and 2.

As shown in a system 300 of FIG. 3, a computer system 302 may generate the GUI 100 and send it to a display device 304 that presents it to a user in a browser 306. Particularly, one or more application programs 308 within the computer system 302 can generate the GUI 100 for display on the display device 304. Any or all of application programs 308A, 308B, or 308C may have an evaluation module 310 that analyzes user input. For example, the evaluation module 310 may be responsible for determining the validity of data that the user enters. Data may be entered using one or more input device(s) 312. Data may be entered under guidance of an input field in the GUI, such as the characters "XX" being entered in the field 102 of FIG. 1. In the above example, evaluation module 310 determines that "XX" is not a valid entry for the Country field 102 and generates the system event that causes the message 204 to be presented in the predefined field 202 as shown in FIG. 2. The computer system may include a message log 314 for collecting error messages. At any time, the message log 314 may contain a larger or smaller list of messages, such as error messages, generated by the system 300.

A user interface management program (UIMP) 316 is responsible for generating the popup window 206 when the message 204 is presented in the predefined field 202. For example, the UIMP 316 is configured to recognize certain system events that are associated with messages being presented in the predefined field 202. The UIMP 316 may monitor the occurrence of such events and respond to them by generating the corresponding popup window 206. The UIMP 316 is configured to generate the second message 208 such that it is associated with the first message 204 presented in the predefined field 202. For example, the UIMP 316 contains a standard message indicating that a new message is being presented in the predefined field 202. As another example, the UIMP 316 is configured to retrieve all or part of the first message 204 and use that information in generating the second message 208. The UIMP 316 also is configured to provide user-selectable options for the popup window 206, such as options that let the user navigate to the predefined field 202 or return to the previous location of the screen reader focus 104. The UIMP can be a separate component or integrated in one or more of the application programs.

Upon the popup window 206 being generated, the focus 104 of a screen reader application 318 moves to the popup window 206 allowing the screen reader application 318 to interpret the message 208 contained in the popup window 206. The screen reader application 318 may generate a predefined output intended for a visually impaired user. For example, the screen reader 318 may convert the message 208 to a form suitable for an output device(s) 320, such as a speaker or a Braille device.

The UIMP 316 detects whether the user is using the screen reader application 318 using information in a user profile 322 associated with the user. For example, when the user logs on to the system 300, the system may consult the user's profile 322, which, if the user is visually impaired, should indicate that the screen reader application 318 is to be used. If the user profile 322 shows that the user is not using the screen reader application 318, the UIMP 316 may omit generation of the popup window 206.

The UIMP 316 may be a useful complement to the screen reader application 318, which may be any kind of screen reader application for use by visually impaired users. For example, in a system that is configured to present messages in a field that is not detectable by some or all screen reader applications, a UIMP may be implemented as a way of ensuring that the presented messages can be accessed by visually impaired users in accordance with applicable accessibility regulations. The UIMP can be implemented as an add-on component to the existing software, such as through a plug-in implementation.

Figure 4:
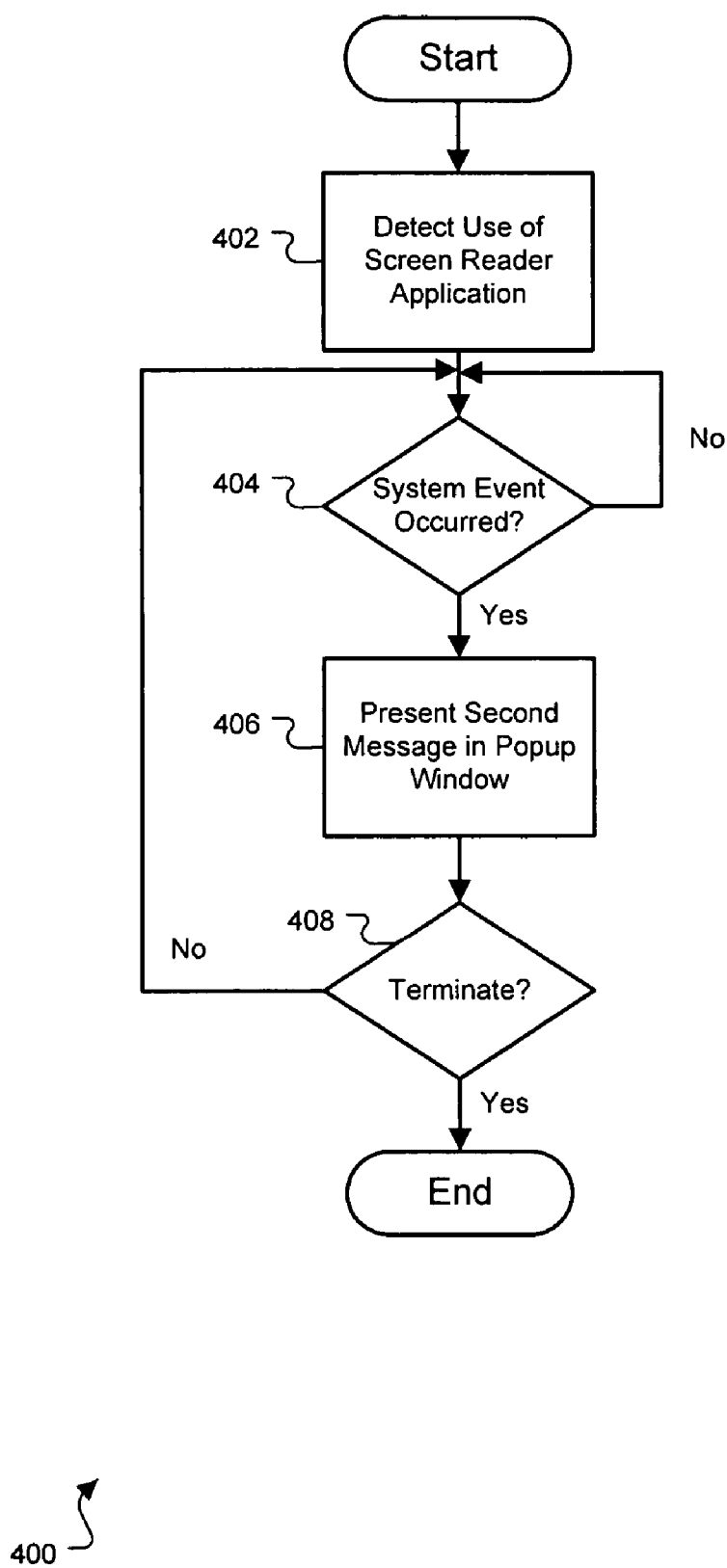
FIG. 4 is a flow chart of exemplary operations that a system may perform when presenting messages to a visually impaired user.

FIG. 4 is a flow chart of exemplary operations 400 that can be performed in generating the GUI 100. A processor executing instructions stored in a computer program product can perform the operations 400. The operations 400 begin in step 402 with the detection that a screen reader application is being used in a computer system having a GUI. In the exemplary system 300, the UIMP 316 uses information about the user stored in the user profile 322 to determine if a screen reader application 318 is being used.

In step 404, it is queried whether a system event resulting from the evaluation of a user input has been detected. Such an event causes a first message to be displayed in a predefined field in the GUI. For example, in the GUI 100 of FIGS. 1 and 2, a user input in the Country field 102 was determined to be invalid by the evaluation module 310 of the application program 308A. In the above example, the application program 308A displayed the error message 204 in the predefined field 202. Step 404 may be repeated until a system event is detected.

If a system event is detected in step 404, a second message, associated with the first message, is presented in a popup window in the GUI in step 406. For example, after the message 204 is presented in the predefined field 202, the UIMP 316 generates the popup window 206 that includes the message 208 indicating that a message is displayed in the predefined field 202. The message 208 may indicate that the message 204 has been generated or may include the message 204 in its entirety, to name two examples. Generating the popup window 206 that contains the message 208 may allow the screen reader application 318 to detect the message 204 even though it may not be configured to automatically detect the change in the predefined field 202.

In step 408, the operations 400 may terminate. For example, a user may terminate the application or it may be terminated at a predetermined time. If the operations 400 do not terminate, the process flow returns to step 404 where another system event may be detected.

Figure 5:
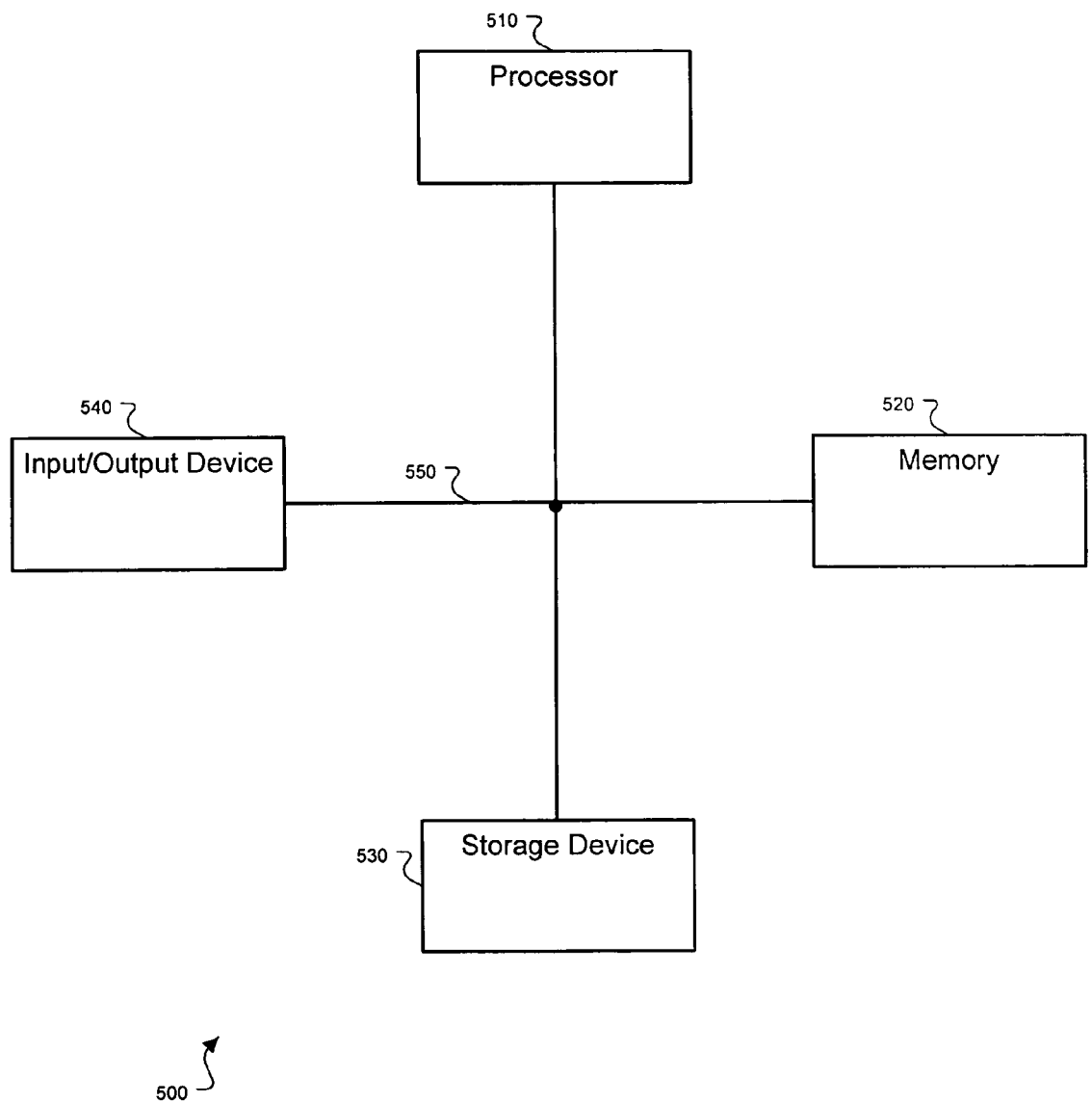
FIG. 5 is a block diagram of a general computer system.

FIG. 5 is a block diagram of a computer system 500 that can be used in the operations described above, according to one embodiment. For example, the system 500 may be included in the system 300.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one embodiment, the processor 510 is a single-threaded processor. In another embodiment, the processor 510 is a multi-threaded processor. The processor 510 is capable of processing instructions stored in the memory 520 or on the storage device 530 to display graphical information for a user interface on the input/output device 540.

The memory 520 stores information within the system 500. In one embodiment, the memory 520 is a computer-readable medium. In one embodiment, the memory 520 is a volatile memory unit. In another embodiment, the memory 520 is a non-volatile memory unit.

The storage device 530 is capable of providing mass storage for the system 500. In one embodiment, the storage device 530 is a computer-readable medium. In various different embodiments, the storage device 530 may be a floppy disk device, a hard disk device, an optical disk device, or a tape device.

The input/output device 540 provides input/output operations for the system 500. In one embodiment, the input/output device 540 includes a keyboard and/or pointing device. In one embodiment, the input/output device 540 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of visually presenting a message in a computer system, the method comprising:
    detecting, in a computer system, that a screen reader application is being used in the computer system, wherein the computer system has a graphical user interface (GUI) that receives user input of data to an input field, wherein the GUI presents, in a predefined field of the GUI, a message in response to a determination that the data that was input to the input field is invalid, wherein the screen reader application is not configured to detect the presentation of the message in the predefined field of the GUI when screen reader focus is at the input field;
    detecting, in the computer system, a system event that causes the message to be presented in the predefined field, the system event resulting from the determination that the data that was input to the input field is invalid; and
    presenting a popup window in the GUI, in response to detecting the system event that causes the message to be presented in the predefined field of the GUI and detecting that the screen reader application is being used, the screen reader application being configured to detect presentation of the popup window when the screen reader focus is at the input field and to then automatically move the screen reader focus from the input field to the popup window, wherein the popup window comprises content that includes the message or a user-selectable option that upon user-selection automatically moves the screen reader focus from the presented popup window to the predefined field that is presenting the message.

2. The method of claim 1, wherein a user of the computer system is associated with a user profile that indicates that the screen reader application is to be used, and wherein detecting that the screen reader application is being used comprises detecting that the user profile is activated.

3. The method of claim 1, wherein the message is triggered by detecting an error being in the user input data.

4. The method of claim 1, wherein the screen reader focus is located at the input field when the system event is detected and wherein the content includes the user-selectable option that upon user selection automatically moves the screen reader focus from the presented popup window to the predefined field that is presenting the message.

5. The method of claim 4, wherein the screen reader focus is automatically moved to the predefined field in response to a user selecting the user-selectable option, and wherein the screen reader focus is later automatically returned to the input field.

6. The method of claim 4, wherein the presented popup window provides another user-selectable option to not automatically move the screen reader focus to the predefined field, and upon user selection of the other user-selectable option, the screen reader focus is automatically moved back to the input field without automatically moving the screen reader focus to the predefined field.

7. The method of claim 1, wherein the content includes the message.

8. The method of claim 1, wherein the computer system includes a message log for holding messages of a same type as the message, and wherein the computer system is configured to present a most recent message of the message log in the predefined field.

9. A computer program product tangibly embodied in a non-transitory computer-readable medium, the computer program product including instructions that, when executed, cause a processor to perform operations comprising:

detecting, in a computer system, that a screen reader application is being used in the computer system, wherein the computer system has a graphical user interface (GUI) that receives user input of data to an input field, wherein the GUI presents, in a predefined field of the GUI, a message in response to a determination that the data that was input to the input field is invalid, wherein the screen reader application is not configured to detect the presentation of the message in the predefined field of the GUI when screen reader focus is at the input field;

detecting, in the computer system, a system event that causes the message to be presented in the predefined field, the system event resulting from the determination that the data that was input to the input field is invalid; and presenting a popup window in the GUI, in response to detecting the system event that causes the message to be presented in the predefined field of the GUI and detecting that the screen reader application is being used, the screen reader application being configured to detect presentation of the popup window when the screen reader focus is at the input field and to then automatically move the screen reader focus from the input field to the popup window, wherein the popup window comprises content that includes the message or a user-selectable option that upon user-selection automatically moves the screen reader focus from the presented popup window to the predefined field that is presenting the message.

10. The computer program product of claim 9, wherein the screen reader focus is located at the input field when the system event is detected and wherein the content includes the user-selectable option that upon user selection automatically moves the screen reader focus from the presented popup window to the predefined field that is presenting the message.

11. The computer program product of claim 10, wherein the presented popup window provides another user-selectable option to not automatically move the screen reader focus to the predefined field, and upon user selection of the other user-selectable option, the screen reader focus is automatically moved back to the input field without automatically moving the screen reader focus to the predefined field.

12. The computer program product of claim 9, wherein the content includes the message.

13. The computer program product of claim 10, wherein the screen reader focus is automatically moved to the predefined field in response to a user selecting the user-selectable option, and wherein the screen reader focus is later automatically returned to the input field.

14. The computer program product of claim 9, wherein a user of the computer system is associated with a user profile that indicates that the screen reader application is to be used, and wherein detecting that the screen reader application is being used comprises detecting that the user profile is activated.

15. The computer program product of claim 9, wherein the message is triggered by detecting an error being in the user input data.

16. The computer program product of claim 9, wherein the content includes the message.

17. The computer program product of claim 9, wherein the computer system includes a message log for holding messages of a same type as the message, and wherein the computer system is configured to present a most recent message of the message log in the predefined field.

18. A computer program product tangibly embodied in a non-transitory computer-readable medium, the computer program product comprising instructions that, when executed, generate on a display device a graphical user interface (GUI) for presenting a message detectable by a screen reader application, the GUI comprising:

an input field for receiving user input of data;

a predefined field for presenting a message in response to a determination that the data that was input to the input field is invalid, wherein the screen reader application is not configured to detect the presentation of the message in the predefined field when a focus of the screen reader is at the input field; and a popup window that is presented in response to detecting a system event that causes the message to be presented in the predefined field of the GUI and in response to detecting that the screen reader application is being used, the system event resulting from the determination that the data that was input to the input field is invalid, the screen reader application being configured to detect presentation of the popup window when the screen reader focus is at the input field and to then automatically move the screen reader focus from the input field to the popup window, wherein the popup window includes content that includes the message or a user-selectable option that upon user-selection automatically moves the screen reader focus from the presented popup window to the predefined field that is presenting the message.

19. The computer program product of claim 18, wherein the screen reader focus is located at the input field when the system event is detected and wherein the content includes the user-selectable option that upon user selection automatically moves the screen reader focus from the presented popup window to the predefined field that is presenting the message.

20. The computer program product of claim 19, wherein the screen reader focus is automatically moved to the predefined field in response to a user selecting the user-selectable option, and wherein the screen reader focus is later automatically returned to the input field.

21. The computer program product of claim 19, wherein the popup window provides another user-selectable option to not automatically move the screen reader focus to the predefined field, and upon user selection of the other user-selectable option, the screen reader focus is automatically moved back to the input field without automatically moving the screen reader focus to the predefined field.

22. The computer program product of claim 18, wherein the content includes the message.

23. The computer program product of claim 18, wherein a user of the GUI is associated with a user profile that indicates that the screen reader application is to be used, and wherein detecting that the screen reader application is being used comprises detecting that the user profile is activated.

24. The computer program product of claim 18, wherein the message is triggered by detecting an error in the user input data.

25. The computer program product of claim 18, wherein the GUI is generated by a computer system that includes a message log for holding messages of a same type as the message, and wherein the computer system is configured to present a most recent message of the message log in the predefined field.

26. A system comprising:

a computer readable medium comprising instructions; and one or more processors configured to execute the instructions to perform operations comprising:

detecting, in a computer system, that a screen reader application is being used in the computer system, wherein the computer system has a graphical user interface (GUI) that receives user input of data to an input field, wherein the GUI presents, in a predefined field of the GUI, a message in response to a determination that the data that was input to the input field is invalid, wherein the screen reader application is not configured to detect the presentation of the message in the predefined field of the GUI when screen reader focus is at the input field;

detecting, in the computer system, a system event that causes the message to be presented in the predefined field, the system event resulting from the determination that the data that was input to the input field is invalid; and presenting a popup window in the GUI, in response to detecting the system event that causes the message to be presented in the predefined field of the GUI and detecting that the screen reader application is being used, the screen reader application being configured to detect presentation of the popup window when the screen reader focus is at the input field and to then automatically move the screen reader focus from the input field to the popup window, wherein the popup window comprises content that includes the message or a user-selectable option that upon user-selection automatically moves the screen reader focus from the presented popup window to the predefined field that is presenting the message.

27. The system of claim 26, wherein the screen reader focus is located at the input field when the system event is detected and wherein the content includes the user-selectable option that upon user selection automatically moves the screen reader focus from the presented popup window to the predefined field that is presenting the message.

28. The system of claim 27, wherein the presented popup window provides another user-selectable option to not automatically move the screen reader focus to the predefined field, and upon user selection of the other user-selectable option, the screen reader focus is automatically moved back to the input field without automatically moving the screen reader focus to the predefined field.

29. The system of claim 27, wherein the screen reader focus is automatically moved to the predefined field in response to a user selecting the user-selectable option, and wherein the screen reader focus is later automatically returned to the input field.

30. The system of claim 26, wherein the content includes the message.

31. The system of claim 26, wherein a user of the computer system is associated with a user profile that indicates that the screen reader application is to be used, and wherein detecting that the screen reader application is being used comprises detecting that the user profile is activated.

32. The system of claim 26, wherein the message is triggered by detecting an error being in the user input data.

33. The system of claim 26, wherein the computer system includes a message log for holding messages of a same type as the message, and wherein the computer system is configured to present a most recent message of the message log in the predefined field.

* * * * *